(12) United States Patent
Kanehagi et al.

(10) Patent No.: US 11,643,513 B2
(45) Date of Patent: May 9, 2023

(54) METHOD AND DEVICE FOR MANUFACTURING FIBER-REINFORCED RESIN MOLDING MATERIAL

(71) Applicant: Mitsubishi Chemical Corporation, Chiyoda-ku (JP)

(72) Inventors: Junji Kanehagi, Tokyo (JP); Tadao Samejima, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 429 days.

(21) Appl. No.: 16/876,173

(22) Filed: May 18, 2020

(65) Prior Publication Data
US 2020/0277455 A1 Sep. 3, 2020

Related U.S. Application Data

(63) Continuation of application No. PCT/JP2018/042700, filed on Nov. 19, 2018.

(30) Foreign Application Priority Data

Nov. 20, 2017 (JP) .............................. JP2017-223119

(51) Int. Cl.
*C08J 5/04* (2006.01)
*C08J 5/24* (2006.01)

(52) U.S. Cl.
CPC .............. *C08J 5/042* (2013.01); *C08J 5/243* (2021.05); *C08J 2300/00* (2013.01)

(58) Field of Classification Search
CPC ........ B65H 51/005; D01D 11/02; D01D 5/42; D01D 5/423; D02J 1/08; D02J 1/18; C08J 5/042; C08J 5/243; C08J 2300/00
(Continued)

(56) References Cited

U.S. PATENT DOCUMENTS

2012/0213997 A1 8/2012 Wang et al.
2017/0260345 A1 9/2017 Bamba et al.
(Continued)

FOREIGN PATENT DOCUMENTS

CN 106687267 A 5/2017
CN 107002316 A 8/2017
(Continued)

OTHER PUBLICATIONS

Extended European Search Report dated Jan. 15, 2021 in European Patent Application No. 18877503.5, citing documents AO through AQ therein, 8 pages.
(Continued)

*Primary Examiner* — Camie S Thompson
(74) *Attorney, Agent, or Firm* — Oblon, McClelland, Maier & Neustadt, L.L.P.

(57) ABSTRACT

A method for manufacturing a fiber-reinforced resin molding material having a cut fiber tow impregnated with a resin includes a separation step of intermittently separating a fiber tow and forming at least two separation-processed lines arranged side by side in a width direction of the fiber tow and a cutting step of cutting the fiber tow at an interval in the longitudinal direction, and the separation step and the cutting step are carried out to satisfy (1) to (3). (1) $1 \leq c/L \leq 50$ (2) $c < a$ (3) $b/L < 1$ "c" is an overlapping length of separated parts when one separation-processed line is projected to another separation-processed line adjacent thereto in the width direction, "L" is the interval in the cutting step, "a" is a length of the separated part in the separation-processed line, and "b" is a length of an unseparated part in the separation-processed line.

18 Claims, 5 Drawing Sheets

(58) Field of Classification Search
USPC .................................................. 428/299.1
See application file for complete search history.

(56) References Cited

U.S. PATENT DOCUMENTS

| | | |
|---|---|---|
| 2017/0355550 A1 | 12/2017 | Kawahara et al. |
| 2018/0194082 A1 | 7/2018 | Samejima et al. |
| 2019/0084186 A1 | 3/2019 | Motohashi et al. |
| 2019/0233604 A1 | 8/2019 | Motohashi et al. |
| 2019/0263625 A1 | 8/2019 | Motohashi et al. |

FOREIGN PATENT DOCUMENTS

| | | |
|---|---|---|
| EP | 3 321 054 A1 | 5/2018 |
| EP | 3 395 526 A1 | 10/2018 |
| EP | 3 431 242 A1 | 1/2019 |
| EP | 3 444 090 A1 | 2/2019 |
| JP | 2006-219780 A | 8/2006 |
| WO | WO 2016/104154 A1 | 6/2016 |
| WO | WO 2017/006989 A1 | 1/2017 |
| WO | WO 2017/111056 A1 | 6/2017 |
| WO | WO 2017/159263 A1 | 9/2017 |
| WO | WO 2017/179506 A1 | 10/2017 |
| WO | WO 2017/221657 A1 | 12/2017 |
| WO | WO 2018/070254 A1 | 4/2018 |

OTHER PUBLICATIONS

Chinese Search Report dated Apr. 15, 2022 in Chinese Patent Application No. 201880074554.2 (with English translation), citing documents AO and AP therein, 3 pages.

International Search Report dated Jan. 22, 2019 in PCT/JP2018/042700 filed on Nov. 19, 2018 (with English Translation), citing AB, AC, AO-AS, & AU-AV therein, 4 pages.

METHOD AND DEVICE FOR MANUFACTURING FIBER-REINFORCED RESIN MOLDING MATERIAL

This application is a continuation application of International Application No. PCT/JP2018/042700, filed on Nov. 19, 2018, which claims the benefit of priority of the prior Japanese Patent Application No. 2017-223119, filed Nov. 20, 2017, the content of which is incorporated herein by reference.

TECHNICAL FIELD

The present invention relates to a method and a device for manufacturing a fiber-reinforced resin molding material.

BACKGROUND ART

As molding materials that provide excellent mechanical characteristics to molded articles and are suitable for molding of complex shapes such as three-dimensional shapes, sheet molding compounds (SMC) or stampable sheets are known. SMC is, for example, a sheet-like fiber-reinforced resin molding material in which a thermosetting resin such as an unsaturated polyester resin is made to penetrate between filaments of cut fiber tows comprising a reinforcing fiber such as a glass fiber or a carbon fiber. In addition, the stampable sheet is, for example, a sheet-like fiber-reinforced resin molding material obtained by impregnating the above-described cut fiber tows with a thermoplastic resin.

SMC is an intermediate material for obtaining molded articles. At the time of molding with SMC, SMC is compressed (pressed) under heating using a mold. In the molding, the fiber tows and the thermosetting resin integrally flow and fill a cavity of the mold, and the thermosetting resin is cured thereafter. Therefore, molded articles of a variety of shapes including one having a partially varied thickness one having a rib, a boss, or the like can be obtained using SMC. In addition, molded articles from the stampable sheet can be obtained by, first, heating the stampable sheet to a temperature equal to or higher than the melting point of the thermoplastic resin using an infrared heater or the like and then cooling and pressurizing the stampable sheet in a mold at a predetermined temperature.

In the manufacturing of the SMC (fiber-reinforced resin molding material), after a paste comprising a thermosetting resin is applied onto a sheet (carrier) being transported, a continuous fiber tow is cut to a predetermined length using a cutting machine and sprinkled onto the paste (for example, refer to Patent Literature 1 and 2).

In manufacturing of SMC, in order to reduce manufacturing cost, a relatively inexpensive fiber tow called a large tow and having a large number of filaments is used in such a way that the fiber tow is broadened in the width direction (referred to as "spreading"), then, the spread fiber tow is divided into a plurality of fiber tows (referred to as "separation"), and the separated fiber tow is cut using a cutting machine.

However, in manufacturing methods of the related art, when a skewing or a meandering of a filament occurs in the fiber tow, the spread fiber tow remains partially unseparated or partially breaks, resulting sometimes in instability of a supply to a cutting machine of the fiber tow that has been spread and then separated. This is also true for the case of the stampable sheet.

Specifically, Patent Literature 1 discloses a separation method in which a spread fiber tow is pierced by a nub. However, in the case of using this method, when a skewing or a meandering of a filaments has occurred in the fiber tow the fiber tow remains partially unseparated, in spite of having been subjected to separation process, even after cutting, and there is a possibility that the fiber tow may not be divided.

Patent Literature 2 discloses a method in which a spread fiber tow is continuously separated using a rotating rotary blade. However, in the case of using this method, when the fiber tow meanders or filaments in the fiber tow move obliquely or meander, a part of the separated fiber tow is cut, and there is a possibility that the cut fiber tow may be wound around a roll or the like.

Patent Literature 3 discloses a method in which, by matching a plurality of rotary blades in the width direction in a circumferential direction, separation is performed to result in a plurality of fiber tows where separated parts and unseparated parts are intermittent. However, in the case of using this method, the unseparated parts continue in the width direction after cutting, and there is a possibility that the dispersibility may deteriorate.

CITATION LIST

Patent Literature

[Patent Literature 1]
United States Patent Application, Publication No. 2012/0213997
[Patent Literature 2]
Japanese Unexamined Patent Application, First Publication No. 2006-219780
[Patent Literature 3]
PCT International Publication No. WO2017/006989

SUMMARY OF INVENTION

Technical Problem

The present invention has been proposed in consideration of the above-described circumstances of the related art. An object of the present invention is to provide a method and a device for manufacturing a fiber-reinforced resin molding material which enables, at the time of manufacturing a sheet-like fiber-reinforced resin molding material by making a resin penetrate between filaments of cut fiber tows, a stable supply of a separated fiber tow to a cutting machine while maintaining a quality of the fiber-reinforced resin molding material and avoiding an influence of a meandering of a fiber tow or a skewing or meandering of a filament occurring in a fiber tow, and with which the cut fiber tows are easily dispersed.

Solution to Problem

A first aspect of the present invention is a method for manufacturing a fiber-reinforced resin molding material in which cut fiber tows are impregnated with a resin, the method includes a separation step of intermittently separating a fiber tow along a longitudinal direction thereof and forming at least two separation-processed lines extending in the longitudinal direction and arranged side by side in a width direction of the fiber tow and a cutting step of cutting the fiber tow after the separation step at an interval in the longitudinal direction, and the separation step and the cutting step are carried out so as to satisfy all of the following (1) to (3).

$$1 \leq c/L \leq 50 \quad (1)$$

$$c < a \quad (2)$$

$$b/L < 1 \quad (3)$$

In the (1) to (3), "c" is an overlapping length of separated parts when one of the separation-processed lines is projected to another separation-processed line adjacent thereto in the width direction; "L" is the interval in the cutting step; "a" is a length of the separated part in the separation-processed line; and "b" is a length of an unseparated part in the separation-processed line.

In the method for manufacturing a fiber-reinforced resin molding material, the separation step and the cutting step may be carried out so as to further satisfy the following (4).

$$0.9 \leq a/(a+b) < 1 \quad (4)$$

The separation-processed lines may be formed by intermittently piercing the fiber tow with a plurality of cutting teeth arranged at a predetermined interval in the width direction of the fiber tow.

In such a case, the plurality of cutting teeth may be provided by arranging side by side at a predetermined interval in the width direction a plurality of rotary blades which have each the cutting teeth arranged circumferentially, and the plurality of cutting teeth may pierce the fiber tow while the plurality of rotary blades is rotated.

Alternatively, the plurality of cutting teeth may be provided by arranging side by side at a predetermined interval in the width direction a plurality of saw blades which have each the cutting teeth arranged in a transportation direction of the fiber tow, and the plurality of cutting teeth may pierce the fiber tow while the plurality of saw blades is reciprocally moved close to and away from the fiber tow.

The separation step may be carried out in a state in which a plurality of the fiber tows are overlaid together.

The resin may be a thermosetting resin.

The method for manufacturing a fiber-reinforced resin molding material of the present invention may include a step of applying a paste comprising the resin onto a first sheet transported in a predetermined direction, a step of sprinkling cut fiber tows onto the first sheet with the paste applied thereon, and a step of overlaying a second sheet with the paste applied thereon on the first sheet with the fiber tows sprinkled thereon and then pressurizing the paste and the fiber tows sandwiched between the first sheet and the second sheet, thereby making the resin penetrate between filaments of the fiber tows.

The method for manufacturing a fiber-reinforced resin molding material may further include a spreading step carried out before the separation step and for spreading the fiber tow in the width direction.

A second aspect of the present invention is a device for manufacturing a fiber-reinforced resin molding material including a s separation portion having a plurality of cutting teeth for separating a continuous fiber tow into a plurality of fiber tows by piercing the fiber tow with the cutting teeth and a cutting portion for cutting the fiber tow processed in the separation portion at an interval in a longitudinal direction of the fiber tow, wherein the separation portion is configured to form at least two separation-processed lines extending in the longitudinal direction and arranged side by side in a width direction of the fiber tow by intermittently piercing the fiber tow with the cutting teeth, and the separation portion and the cutting portion are configured to operate so as to satisfy all of the following (1) to (3).

$$1 \leq c/L \leq 50 \quad (1)$$

$$c < a \quad (2)$$

$$b/L < 1 \quad (3)$$

In the (1) to (3), "c" is a overlapping length of separated parts when one of the separation-processed lines is projected to another separation-processed line adjacent thereto in the width direction; "L" is the interval in the cutting portion; "a" is a length of the separated part in the separation-processed line; and "b" is a length of an unseparated part in the separation-processed line.

The separation portion and the cutting portion may be configured to operate so as to further satisfy the following (4).

$$0.9 \leq a/(a+b) < 1 \quad (4)$$

The separation portion may be configured to have a plurality of rotary blades which have each the cutting teeth arranged circumferentially and which are arranged at a predetermined interval in the width direction so as to provide the plurality of cutting teeth and so as to enable that the plurality of cutting teeth pierce the fiber tow while the plurality of rotary blades is rotated.

The separation portion may be configured to have a plurality of saw blades which have each the cutting teeth arranged in the same direction as a transportation direction of the fiber tow and which are arranged at a predetermined interval in the width direction so as to provide the plurality of cutting teeth and so as to enable that the plurality of cutting teeth pierce the fiber tow while the plurality of saw blades is reciprocally moved close to and away from the fiber tow.

The device for manufacturing a fiber-reinforced resin molding material may be configured so that a spacer member is further provided to be arranged between the plurality of rotary blades or between the plurality of saw blades, and so that in the separation portion, the plurality of cutting teeth pierce into the fiber tow until the spacer member comes into contact with the fiber tow.

The device for manufacturing a fiber-reinforced resin molding material may be configured to further include a pair of guide members arranged on both sides in the transportation direction of the fiber tow and on a side opposite to the cutting teeth across the fiber tow, such that the guide members support the fiber tow pierced by the plurality of cutting teeth.

The device for manufacturing a fiber-reinforced resin molding material may further includes a first application portion for applying a paste including a resin onto a first sheet being transported in a predetermined direction, a second application portion for applying the paste onto a second sheet being transported in a predetermined direction, an impregnation portion configured to pressurize the paste between the first sheet and the second sheet overlaid together, a first transportation portion for transporting the first sheet with the paste applied thereon to the impregnation portion, and a second transportation portion for transporting the second sheet with the paste applied thereon to the impregnation portion, the cutting portion may be arranged so that cut fiber tows are sprinkled onto the paste on the first sheet, and the first transportation portion and the second transportation portion may be arranged so that the first sheet and the second sheet are overlaid together after the fiber tows are sprinkled onto the first sheet.

That is, the present invention has the following aspects.

[1] A method for manufacturing a fiber-reinforced resin molding material in which a cut fiber tow is impregnated with a resin, the method including:

a separation step of intermittently separating a fiber tow along a longitudinal direction thereof and forming at least two separation-processed lines extending in the longitudinal direction and arranged side by side in a width direction of the fiber tow; and a cutting step of cutting the fiber tow after the separation step at an interval in the longitudinal direction, wherein the separation step and the cutting step are carried out so as to satisfy all of (1) to (3) below.

$$1 \leq c/L \leq 50 \tag{1}$$

$$c < a \tag{2}$$

$$b/L < 1 \tag{3}$$

(in the (1) to (3), "c" is a overlapping length of separated parts when one of the separation-processed lines is projected to another separation-processed line adjacent thereto in the width direction; "L" is the intervals in the cutting step; "a" is a length of the separated part in the separation-processed line; and "b" is a length of an unseparated part in the separation-processed line).

[2] The method for manufacturing a fiber-reinforced resin molding material according to [1], wherein the separation step and the cutting step are carried out so as to further satisfy the following (4).

$$0.9 \leq a/(a+b) < 1 \tag{4}$$

[3] The method for manufacturing a fiber-reinforced resin molding material according to [1] or [2], wherein the separation-processed lines are formed by intermittently piercing the fiber tow with a plurality of cutting teeth arranged at a predetermined interval in the width direction of the fiber tow.

[4] The method for manufacturing a fiber-reinforced resin molding material according to [3], wherein the plurality of cutting teeth are provided by arranging, side by side at a predetermined interval in the width direction, a plurality of rotary blades each having the cutting teeth arranged circumferentially, and the plurality of cutting teeth pierce the fiber tow while the plurality of rotary blades are rotated.

[5] The method for manufacturing a fiber-reinforced resin molding material according to [3], wherein the plurality of cutting teeth are provided by disposing, side by side at a predetermined interval in the width direction, a plurality of saw blades each having the cutting teeth arranged along a transportation direction of the fiber tow, and the plurality of cutting teeth pierce the fiber tow while the plurality of saw blades are reciprocally moved close to and away from the fiber tow.

[6] The method for manufacturing a fiber-reinforced resin molding material according to any one of [1] to [5], wherein the separation step is carried out in a state in which a plurality of the fiber tows are overlaid together.

[7] The method for manufacturing a fiber-reinforced resin molding material according to any one of [1] to [6], wherein the resin is a thermosetting resin.

[8] The method for manufacturing a fiber-reinforced resin molding material according to any one of [1] to [7], the method further including:

a step of applying a paste comprising the resin onto a first sheet transported in a predetermined direction;

a step of sprinkling cut fiber tows onto the first sheet with the paste applied thereon; and a step of overlaying a second sheet with the paste applied thereon on the first sheet with the fiber tows sprinkled thereon and then pressurizing the paste and the fiber tows sandwiched between the first sheet and the second sheet, thereby making the resin penetrate between filaments of the fiber tows.

[9] The method for manufacturing a fiber-reinforced resin molding material according to any one of [1] to [8], the method further including:

a spreading step that is carried out before the separation step and for spreading the fiber tow in the width direction.

[10] A device for manufacturing a fiber-reinforced resin molding material, including:

a separation portion having a plurality of cutting teeth for separating a continuous fiber tow into a plurality of fiber tows by piercing the fiber tow with the cutting teeth; and a cutting portion for cutting the fiber tow processed in the separation portion at an interval in a longitudinal direction of the fiber tow, wherein the separation portion is configured to be able to form at least two separation-processed lines extending in the longitudinal direction and arranged side by side in a width direction of the fiber tow by intermittently piercing the fiber tow with the cutting teeth, and the separation portion and the cutting portion are configured to operate so as to satisfy all of (1) to (3) below, $$1 \leq c/L \leq 50 \tag{1}$$

$$c < a \tag{2}$$

$$b/L < 1 \tag{3}$$

(in the (1) to (3), "c" is a overlapping length of separated parts when one of the separation-processed lines is projected to another separation-processed line adjacent thereto in the width direction; "L" is the intervals in the cutting portion; "a" is a length of the separated part in the separation-processed line; and "b" is a length of an unseparated part in the separation-processed line).

[11] The device for manufacturing a fiber-reinforced resin molding material according to [10], wherein the separation portion and the cutting portion are configured to operate so as to further satisfy (4) below.

$$0.9 \leq a/(a+b) < 1 \tag{4}$$

[12] The device for manufacturing a fiber-reinforced resin molding material according to [10] or [11], wherein the separation portion has a plurality of rotary blades which have each the cutting teeth arranged circumferentially and which are arranged at a predetermined interval in the width direction so as to provide the plurality of cutting teeth and so as to enable that the plurality of cutting teeth pierce the fiber tow while the plurality of rotary blades is rotated.

[13] The device for manufacturing a fiber-reinforced resin molding material according to [10] or [11], wherein the separation portion has a plurality of saw blades which have each the cutting teeth arranged in the same direction as a transportation direction of the fiber tow and which are arranged at a predetermined interval in the width direction so as to provide the plurality of cutting teeth and so as to enable that the plurality of cutting teeth pierce the fiber tow while the plurality of saw blades is reciprocally moved close to away from the fiber tow.

[14] The device for manufacturing a fiber-reinforced resin molding material according to [12] or [13], wherein:

a spacer member is further provided to be arranged between the plurality of rotary blades or between the plurality of saw blades, and in the separation portion, the plurality of cutting teeth pierce into the fiber tow until the spacer member comes into contact with the fiber tow.

[15] The device for manufacturing a fiber-reinforced resin molding material according to any one of [10] to [14], further including:

a pair of guide members arranged on both sides in the transportation direction of the fiber tow and on a side opposite to the cutting teeth across the fiber tow, wherein the guide members support the fiber tow pierced by the plurality of cutting teeth.

[16] The device for manufacturing a fiber-reinforced resin molding material according to any one of [10] to [15], the device further comprising:

a first application portion for applying a paste comprising a resin onto a first sheet being transported in a predetermined direction;

a second application portion for applying the paste onto a second sheet being transported in a predetermined direction;

an impregnation portion configured to pressurize the paste between the first sheet and the second sheet overlaid together;

a first transportation portion for transporting the first sheet with the paste applied thereon to the impregnation portion; and a second transportation portion for transporting the second sheet with the paste applied thereon to the impregnation portion, wherein the cutting portion is arranged so that cut fiber tows are sprinkled onto the paste on the first sheet, and the first transportation portion and the second transportation portion are arranged so that the first sheet and the second sheet are overlaid together after the fiber tows are sprinkled onto the first sheet.

[17] The method for manufacturing a fiber-reinforced resin molding material according to any one of [1] to [9], wherein a value of the c/L is preferably 1.05 to 50, more preferably 1.05 to 30, still more preferably 1.05 to 20, particularly preferably 1.05 to 5, and most preferably 1.05 to 4.

[18] The method for manufacturing a fiber-reinforced resin molding material according to any one of [1] to [9] and [17], wherein a value of the c and a value of the a preferably satisfy $1.1c \leq a$, more preferably satisfy $1.5c \leq a$, and still more preferably satisfy $2c \leq a$.

[19] The method for manufacturing a fiber-reinforced resin molding material according to any one of [1] to [9], [17], and [18], wherein a value of the b/L is preferably more than zero and one or less and more preferably more than zero and 0.1 or less.

[20] The method for manufacturing a fiber-reinforced resin molding material according to any one of [1] to [9] and [17] to [19], wherein a value of the a/(a+b) is 0.92 to 0.99.

[21] The device for manufacturing a fiber-reinforced resin molding material according to any one of [10] to [16], wherein a value of the c/L is preferably 1.05 to 50, more preferably 1.05 to 30, still more preferably 1.05 to 20, particularly preferably 1.05 to 5, and most preferably 1.05 to 4.

[22] The device for manufacturing a fiber-reinforced resin molding material according to any one of [10] to [16] and [21], wherein a value of the c and a value of the a preferably satisfy $1.1c \leq a$, more preferably satisfy $1.5c \leq a$, and still more preferably satisfy $2c \leq a$.

[23] The device for manufacturing a fiber-reinforced resin molding material according to any one of [10] to [16], [21] and [22], wherein a value of the b/L is preferably more than zero and one or less and more preferably more than zero and 0.1 or less.

[24] The device for manufacturing a fiber-reinforced resin molding material according to any one of [10] to [16] and [21] to [23], wherein a value of the a/(a+b) is 0.92 to 0.99.

Advantageous Effects of Invention

According to the method and the device for manufacturing a fiber-reinforced resin molding material of the present invention, it is possible to stably supply a separated fiber tow to a cutting machine while maintaining a quality of a fiber-reinforced resin molding material to be manufactured and avoiding an influence of a meandering of a fiber tow or a skewing or meandering of a filament occurring in a fiber tow, and cut fiber tows are also easily dispersed.

DESCRIPTION OF EMBODIMENTS

Figure 1:
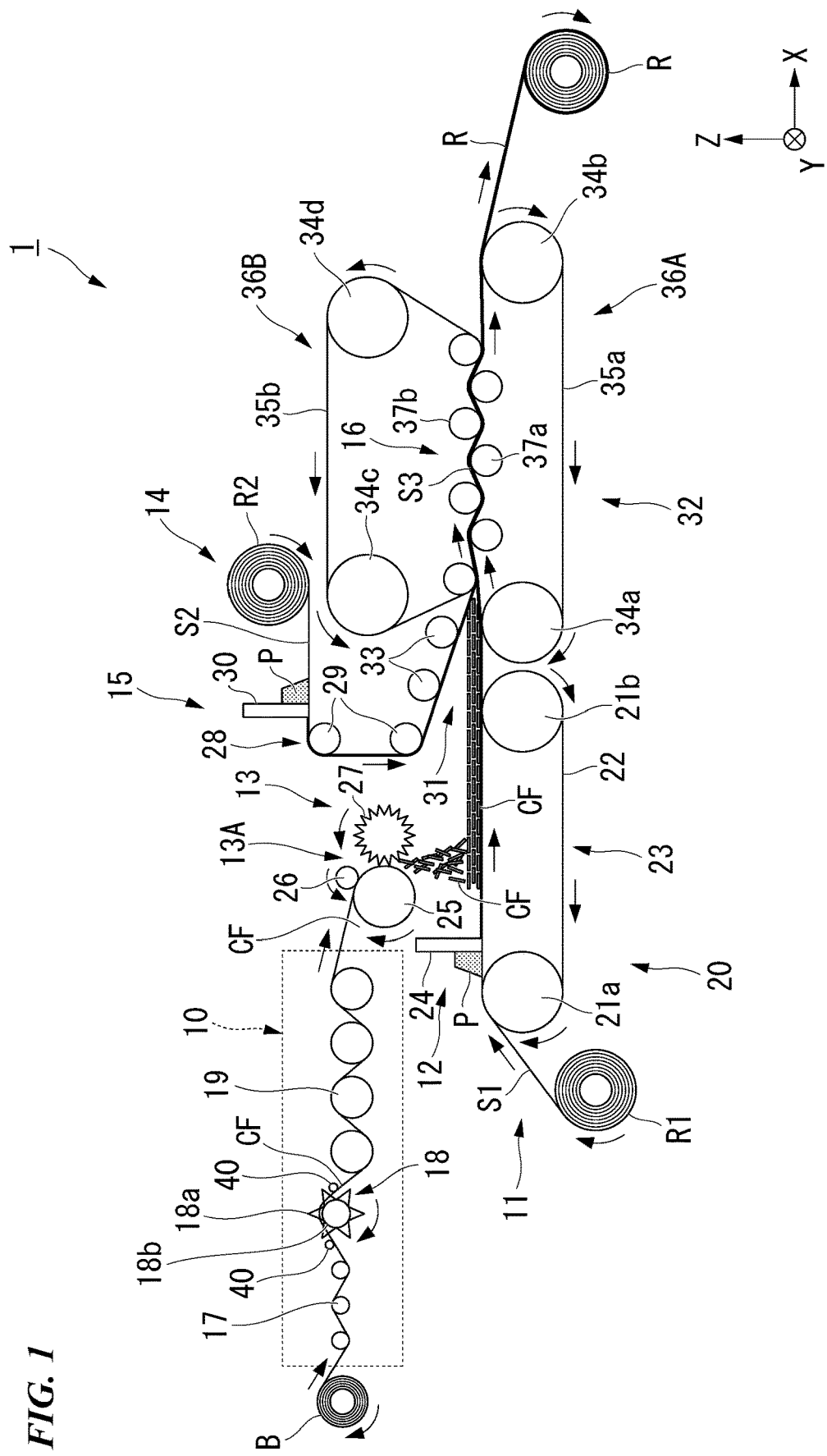
FIG. 1 is a side view showing a configuration of an SMC manufacturing device according to an embodiment of the present invention.

Hereinafter, an embodiment of the present invention will be described in detail with reference to FIG. 1 to FIG. 6B.

In the following description, materials, dimensions, and the like are simply examples, and the present invention is not necessarily limited thereto and can be appropriately modified and carried out within the scope of the gist of the present invention.

[Method for Manufacturing Fiber-Reinforced Resin Molding Material]

A method for manufacturing a fiber-reinforced resin molding material (hereinafter, the method and the material may be simply referred to respectively as "manufacturing method" and "molding material.") of the present embodiment is a method for manufacturing a sheet-like fiber-reinforced resin molding material obtained by making a resin penetrate between filaments of cut fiber tows and is applicable to manufacturing of SMC, stampable sheets, and the like.

The fiber tow refers to a plurality of reinforcing fibers bundled. As the reinforcing fiber used in the manufacturing method of the present embodiment, for example, a carbon fiber is preferred, but reinforcing fibers other than the carbon fiber such as a glass fiber may also be used.

As the resin used in the manufacturing method of the present embodiment, any of a thermosetting resin and a thermoplastic resin can be used. In the manufacturing method of the present embodiment, only a thermosetting resin may be used or only a thermoplastic resin may be used. Furthermore, both a thermosetting resin and a thermoplastic resin may be used.

In a case where a molding material manufactured by the manufacturing method of the present embodiment is used as SMC, the resin used is preferably a thermosetting resin. On the other hand, in a case where the molding material is used as a stampable sheet, the resin used is preferably a thermoplastic resin.

As the thermosetting resin, for example, an unsaturated polyester resin, an epoxy resin, a vinyl ester resin, a phenol resin, an epoxy acrylate resin, an urethane acrylate resin, a phenoxy resin, an alkyd resin, an urethane resin, a maleimide resin, a cyanate resin, and the like are exemplified. Only a single kind of thermosetting resin may be used or two or more thermosetting resins may be jointly used.

As the thermoplastic resin, for example, a polyolefin-based resin, a polyamide-based resin, a polyester-based resin, a polyphenylenesulfide resin, a polyether ketone resin, a polyether sulfone resin, an aromatic polyamide resin, and the like are exemplified. Only a single kind of thermoplastic resin may be used or two or more thermoplastic resins may be jointly used.

The manufacturing method of the present embodiment includes a separation step of intermittently separating the fiber tow along a longitudinal direction thereof and forming at least two separation-processed lines extending in the longitudinal direction and arranged side by side in the width direction of the fiber tow and a cutting step of cutting the fiber tow after the separation step at an interval in the longitudinal direction. A feature of the manufacturing method of the present embodiment is that the separation step and the cutting step are carried out so as to satisfy all of the following (1) to (3).

$$1 \leq c/L \leq 50 \quad (1)$$

$$c < a \quad (2)$$

$$b/L < 1 \quad (3)$$

Figure 3:
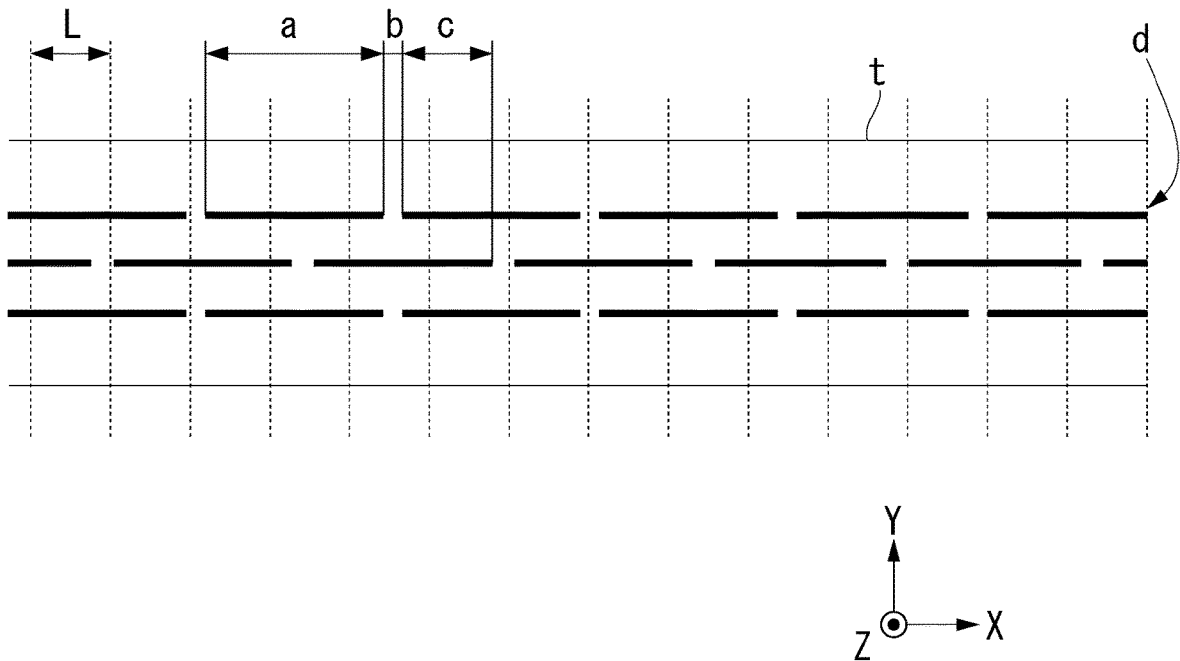
FIG. 3 is a schematic view showing separation positions in a separated fiber tow.

In the (1) to (3), "c" is an overlapping length of separated parts when one of the separation-processed lines is projected to another separation-processed line adjacent thereto in the width direction of the fiber tow. "L" is the cutting interval of the fiber tow in a cutting portion and is approximately equal to the length of the cut fiber tow. "a" is a length of a separated part in the separation-processed line. "b" is a length of an unseparated part in the separation-processed line.

a, b, c, and L are also shown in FIG. 3.

a, b, c, and L were measured at arbitrarily selected five points in increments of 0.1 mm using a caliper, and the average values thereof were calculated.

The inventors found that, when a fiber tow is separated and cut so as to satisfy the (1) to (3) in the separation step and the cutting step, it is possible to supply the separated fiber tow stably to a cutting machine and cut it while avoiding an influence of a skewing or meandering of a filament occurring in the fiber tow.

When the value of c/L is less than one, that is, the length c of the overlapping parts in the longitudinal direction of the separated parts of the adjacent separation-processed lines is shorter than the cutting interval L, at least two unseparated parts that are not divided are generated in each cut fiber tow, and every cut fiber tow inevitably becomes not fully divided in the width direction. Therefore, for example, at the time of manufacturing SMC, it becomes difficult to uniformly disperse the reinforced fibers and the impregnatability with the resin degrades, resulting in that the quality of SMC to be manufactured is likely to significantly degrade.

The value of c/L is preferably 1.05 or more. Furthermore, when the value of c/L is 50 or less, even in a case where a skewing or meander of a filament exists in a fiber tow to be separated, the generation of fluff in cut fiber tows and a process trouble due to the fluff is reduced. The value of c/L is preferably 30 or less, more preferably 20 or less, still more preferably 5 or less, and particularly preferably 4 or less.

Specifically, the value of c/L is preferably 1.05 to 50, more preferably 1.05 to 30, still more preferably 1.05 to 20, particularly preferably 1.05 to 5, and most preferably 1.05 to 4.

The value of a needs to be larger than the value of c, that is, c<a. This is because, in a case where the values of a and c are the same, unseparated parts lie in a row in the width direction in an individual cut fiber tow and there is a possibility that it may become difficult to uniformly disperse the reinforce fiber, for example, at the time of manufacturing SMC. 1.1c≤a is preferred, 1.5c≤a is more preferred, and 2c≤a is still more preferred.

In a case where the value of b/L is one or more, the cut fiber tows inevitably become not fully divided in the width direction. Therefore, for example, at the time of manufacturing SMC, it becomes difficult to uniformly disperse the reinforced resin, the impregnatability with the resin degrades, resulting in that the quality of SMC to be manufactured is likely to significantly degrade. Therefore, in the manufacturing method of the present embodiment, it is essential that b/L is less than one. Furthermore, when the value of b/L is 0.1 or less, even in a case where a skewing or meander of a filament has occurred in a fiber tow, cut fiber tows easily disperse.

Specifically, the value of b/L is preferably more than zero and one or less and more preferably more than zero and 0.1 or less.

In the manufacturing method of the present embodiment, it is preferable that a continuous fiber tow is intermittently separated in the longitudinal direction such that a condition of Expression (4) is satisfied and cut at an interval in the longitudinal direction to obtain cut fiber tows.

$$0.9 \leq a/(a+b) < 1 \quad (4)$$

In a case where the value of a/(a+b) is less than 0.9, the unseparated parts of the cut fiber tows are not easily divided, for example, at the time of sprinkling the fiber tows on a paste during the manufacturing of SMC, and thus it becomes difficult to uniformly disperse the reinforcing fiber on the paste, the impregnatability of the reinforcing fiber with the resin degrades, resulting in that the quality of SMC to be manufactured is likely to degrade. The value of a/(a+b) is more preferably 0.92 or more.

In a case where there is no unseparated part in the processing of a fiber tow (that is, b=0), this case corresponds to a situation in which the fiber tow is continuously separated in the longitudinal direction, and the value of a/(a+b) is one. In this case, due to an absence of the unseparated part, when the fiber tow meanders or a skewing or meander of a filament has occurred in the fiber tow, the separated fiber tow is partially broken, and broken fiber tow may twine around a roll or the like. In the manufacturing method of the present embodiment, the continuous fiber tow is intermittently separated in the longitudinal direction, and thus there is no case where there is no unseparated part (that is, b>0). Therefore, a/(a+b)<1 is satisfied at all times.

From the viewpoint of stably supplying the separated fiber tow up to a cutting machine, the value of a/(a+b) is preferably 0.99 or less.

Specifically, the value of a/(a+b) is preferably 0.92 to 0.99.

In an aspect of intermittently separating a continuous fiber tow, it is preferable, from the viewpoint of better stability in separation of a fiber tow, to intermittently pierce the continuous fiber tow with a plurality of cutting teeth arranged serially at a predetermined interval in the width direction of the continuous fiber tow, thereby partially leaving the fiber tow unseparated in each space between parts where the fiber tow being separated into a plurality of fiber tows.

The number of the plurality of cutting teeth arranged serially at a predetermined interval in the width direction of the continuous fiber tow only needs to be two or more and has no particular upper limit. As the number of cutting teeth used for separation per width of the fiber tow increases, the width of the cut fiber tow becomes narrower, and the quality of SMC to be manufactured further improves.

The separation step is preferably carried out in an aspect in which positions of the tooth tip of a plurality of rotary blades are shifted therebetween in the direction of the fiber tow, the rotary blades having each a circumferentially arranged plurality of cutting teeth and being arranged side by side at a predetermined interval in the width direction of the continuous fiber tow, and the plurality of cutting teeth intermittently pierce the continuous fiber tow while the rotary blades are rotated. Alternatively, an aspect in which a saw blade having a plurality of cutting teeth arranged in the same direction as the transportation direction of the fiber tow is used and the plurality of cutting teeth intermittently pierce the continuous fiber tow while the saw blade is oscillated in the vertical direction is also preferred.

In the present invention, the "cutting blade" refers to a plate-like member in which a tip, the part which first comes into contact with the fiber tow, is made slim and thin and the cross section of the tip is approximately wedge shaped. As a material of the blade, a hard material such as metal or ceramic is exemplified.

The shape of the cutting tooth is not particularly limited as long as it can pierce a fiber tow. From the viewpoint of the durability or separation ability, the maximum thickness of cutting tooth is preferably 0.3 to 2 mm at a part which comes into contact with a fiber tow. The maximum width of the cutting tooth is preferably 0.5 to 1.5 mm at a part which comes into contact with a fiber tow. The angle of the tip in the width direction of the cutting tooth (tip angle) is preferably 30° to 90°. The blade angle in the thickness direction of the cutting tooth (cutting edge angle) is preferably 10° to 45° and more preferably 20° to 30°.

The "tip angle" refers to an angle of a tip of a cutting tooth when the cutting tooth is plan-viewed. The "cutting edge angle" refers to an angle of an edge of the cutting tooth when the cutting tooth is side-viewed.

As an additional aspect of intermittently separating the continuous fiber tow, means not using blades, for example, an aspect in which a gas such as an air is blown to the fiber tow under a predetermined condition can be exemplified. Even in such an aspect, it is possible to satisfy the (1) to (3) by, for example, intermittently blowing a gas to the fiber tow.

Fiber tows obtained by cutting at an interval in the longitudinal direction after intermittently separating of a continuing fiber tow are dividable, such that, in the cut fiber tows, a weight proportion of one comprising tows remaining connected in the width direction through the unseparated parts and of which number is the same as the number the separation, that is, a fiber tow having a width that does not change before and after the cutting, is preferably 10% or less and more preferably 5% or less. When many of the cut fiber tows comprise tows connected in the width direction through the unseparated parts, there is a tendency that the quality of a molding material to be manufactured degrades. By satisfying the above mentioned (1) to (3) defective separation of the fiber tow in the width direction becomes less frequent, and the weight proportion of the not fully separated fiber tows is decreased, making it possible to improve the quality of a molding material to be manufactured.

The manufacturing method of the present invention essentially includes the separation step and the cutting step described above and, in the embodiment, may also include, in addition to the above-described steps, an application step, a sprinkling step, and an impregnation step described below. The manufacturing method of the embodiment, which is executed with a device for manufacturing a fiber-reinforced resin molding material described below, includes the following steps.

Application step: A paste comprising a resin is applied onto a first sheet transported in a predetermined direction.

Separation step: Separation-processed lines are formed in a continuous fiber tow to separate the fiber tow into a plurality of fiber tows.

Cutting step: The fiber tow separated in the separation step are cut using a cutting machine.

Sprinkling step: The fiber tows cut in the cutting step are sprinkled onto the paste applied in the application step.

Impregnation step: A second sheet onto which a paste is applied is overlaid on the first sheet on which the fiber tows has been sprinkled in the sprinkling step, and then the paste and the fiber tows sandwiched between the first sheet and the second sheet are pressurized, thereby making the resin penetrate between filaments of the fiber tows.

In the separation step, the continuous fiber tows may be transported in a state of being overlaid with each other in the thickness direction and separated into a plurality of fiber tows.

It is also possible to spread the continuous fiber tow in the width direction and then separate the spread fiber tow into a plurality of fiber tows. That is, a spreading step of spreading a continuous fiber tow in the width direction before the separation step may be further provided.

In the above-described manner, a high-quality molding material can be manufactured from a relatively inexpensive large tow.

[Device for Manufacturing Fiber-Reinforced Resin Molding Material]

Hereinafter, as a device for manufacturing a fiber-reinforced resin molding material (hereinafter, simply referred to as the "manufacturing device" in some cases) according to the embodiment, an SMC manufacturing device shown in FIG. 1 and FIG. 2 will be specifically described. The SMC manufacturing device of the embodiment is an example of the manufacturing device of the present invention and a manufacturing device with which the manufacturing method of the present invention may be executed.

The SMC manufacturing device of the embodiment is a device for manufacturing a sheet-like sheet molding compound (SMC) which comprises a fiber tow comprising a carbon fiber and a thermosetting resin comprising an unsaturated polyester resin and in which the thermosetting resin has penetrated between filaments of the fiber tows which have been cut. As the fiber tow, in addition to the carbon fiber, a reinforcing fiber such as a glass fiber can be used. As the resin, in addition to the thermosetting resin, a thermoplastic resin can be used.

Figure 2A:
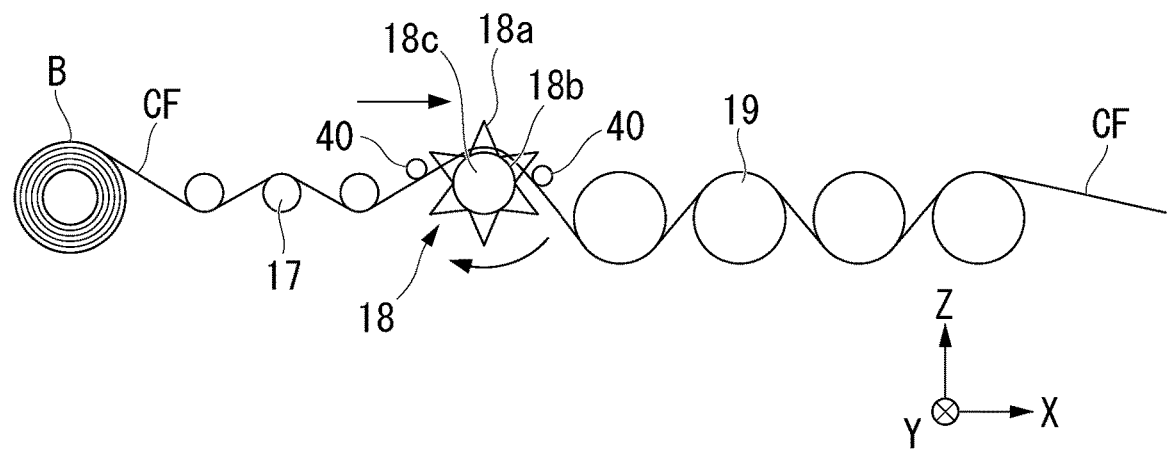
FIG. 2A is a side view showing a configurational example of a fiber tow supply portion provided in the SMC manufacturing device shown in FIG. 1.
Figure 2B:
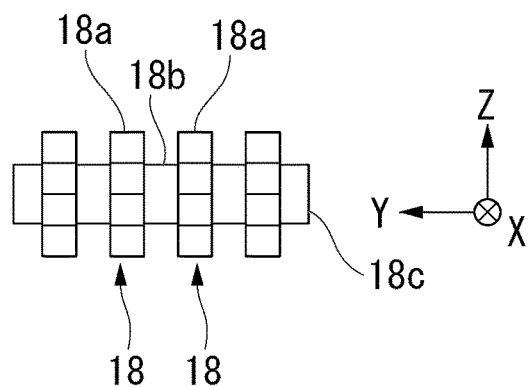
FIG. 2B is a configurational example of the fiber tow supply portion provided in the SMC manufacturing device shown in FIG. 1 and a front view of its separation portion viewed from a transportation direction.

FIG. 1 is a side view schematically showing the configuration of an SMC manufacturing device 1. FIG. 2A is a side view showing a configurational example of a fiber tow supply portion 10 provided in the SMC manufacturing device 1, and FIG. 2B is a front view of a separation portion, which is a part of the fiber tow supply portion 10, viewed from a transportation direction.

In the following description, an XYZ orthogonal coordinate system is set, and positional relationships between individual members will be described with reference to the XYZ orthogonal coordinate system shown in the respective drawings.

As shown in FIG. 1, the SMC manufacturing device 1 includes a fiber tow supply portion 10, a first sheet supply portion 11, a first application portion 12, a cutting portion 13, a second sheet supply portion 14, a second application portion 15, and an impregnation portion 16.

As shown in FIG. 2A in an enlarged manner, the fiber tow supply portion 10 has a spreading portion 1 configured to spread a continuous fiber tow CF in a width direction (Y-axis direction) while transporting the fiber tow in a predetermined direction (hereinafter, referred to as the transportation direction) and a separation portion configured to separate the spread fiber tow CF into a plurality of fiber tows CF.

The fiber tow supply portion 10 of the embodiment includes a plurality of spreading bars 17 as the spreading portion and a plurality of rotary blades 18 and a plurality of godet rollers 19 as the separation portion, respectively.

In the fiber tow supply portion 10, first, the fiber tow CF being a large tow pulled out from a bobbin B toward an X-axis positive direction (the right side in the horizontal direction) in FIG. 1 is spread in the width direction. Specifically, while the fiber tow CF passes through the plurality of spreading bars 17 constituting the spreading portion, heating, scraping, shaking, and the like are carried out on the fiber tow CF through the respective spreading bars 17, whereby the fiber tow CF is broadened in the width direction and spread.

Next, separation-processed lines are formed on the spread fiber tow CF using the plurality of rotary blades 18 constituting the separation portion, and the fiber tow is separated into a plurality of fiber tows CF arranged in the width direction. The plurality of rotary blades 18 is arranged at a predetermined interval in the width direction of the spread fiber tow CF (Y-axis direction) so that the rotation centers coincide or substantially coincide with each other. In each of the rotary blades 18, a plurality of cutting teeth 18a is arranged side by side in the circumferential direction. Between the rotary blades 18, the plurality of cutting tooth 18a is preferably arranged at positions shifted from each other in the circumferential direction, thereby dispersion of the fiber tows CF after cutting can be facilitated.

As shown in FIG. 2B, a ring-like spacer member 18b is arranged in each space between the rotary blades 18. The outer circumferential surface of the spacer member 18b is positioned slightly outward from the boundary between the cutting teeth 18a (a base of a cutting tooth). The cutting teeth 18a can not pierce deeper than the depth when the spacer member 18 comes in contact with the fiber tow CF, and thus it is possible to adjust the piercing depth of the cutting tooth 18a into the fiber tow CF by changing the positional relationship between the outer circumferential surface and the bases of the cutting teeth by exchanging the spacer member with another one having a different dimension. In a case where the adjustment is not required, the spacer member 18b may be removed.

The plurality of rotary blades 18 is rotatably supported by a shaft member 18c extending through the rotation centers. Therefore, it is possible to rotate the plurality of rotary blades 18 in the same direction as the transportation direction of the fiber tow CF while piercing the fiber tow CF with the cutting teeth 18a in association with the transportation of the fiber tow CF. As a different example, a configuration in which the plurality of rotary blades 18 is fixed to the shaft member 18c and the shaft member 18c and the plurality of rotary blades 18 are rotary-driven by a driving motor or the like in synchronization with the transportation of the fiber tow CF may also be employed.

On both sides of the plurality of rotary blades 18 in the transportation direction, a pair of guide members 40 is arranged so that the plurality of rotary blades 18 is arranged between them. The pair of guide members 40 is arranged opposite to the plurality of rotary blades 18 across the fiber tow CF.

Therefore, in the separation step executed with the SMC manufacturing device 1, the plurality of rotary blades 18 comes close to the fiber tow CF moving between the pair of guide members 40 from a side opposite to the side on which the pair of guide members 40 is arranged, and the plurality of cutting teeth 18a pierce the fiber tow CF. At this time, the pair of guide members 40 supports the fiber tow CF pierced by the plurality of cutting teeth 18a such that the fiber tow does not move in the thickness direction, and thus the separation is suitably carried out with the plurality of cutting teeth 18a.

The continuous fiber tow CF is intermittently pierced with the plurality of cutting teeth 18a while rotating each of the rotary blades 18, whereby the fiber tow CF is separated in the width direction. At this time, the plurality of cutting teeth 18a pierces up to a position at which the spacer members 18b come into contact with the continuous fiber tow CF, whereby the fiber tow CF is prevented from being continuously separated with the cutting teeth 18a. Thereby, the fiber tow CF is not fully separated and is partially left unseparated in each space between parts where the fiber tow being separated into a plurality of fiber tows. After that, the separated fiber tow CF is supplied toward the cutting portion 13 while being guided by the plurality of godet rollers 19.

The first sheet supply portion 11 supplies a continuous first sheet S1 unwound from a first original roll R1 toward the first application portion 12. The SMC manufacturing device 1 includes a first transportation portion 20 configured to transport the first sheet S1 toward the impregnation portion 16.

The first transportation portion 20 has a conveyor 23 having an endless belt 22 looped between a pair of pulleys 21*a* and 21*b*. The conveyor 23 rotates the pair of pulleys 21*a* and 21*b* in the same direction to orbit the endless belt 22 and transports the first sheet S1 in the X-axis positive direction shown in FIG. 1 on the surface of the endless belt 22.

The first application portion 12 has a coater 24 that is arranged above the first sheet S1 transported in the X-axis positive direction shown in FIG. 1 and supplies a paste P comprising a resin. In the first application portion 12, the first sheet S1 passes through the coater 24, whereby the paste P is applied onto a surface of the first sheet S1 in a predetermined thickness.

As the paste P, it is possible to use a paste obtained by appropriately mixing, in addition to the above-described thermosetting resin such as an unsaturated polyester resin, a filler such as calcium carbonate, a low shrinking agent, a mold release agent, a curing initiator, a viscosity improver, and the like.

The cutting portion 13 is provided downstream of the first application portion 12 in the transportation direction, cuts the fiber tow CF supplied from the fiber tow supply portion 10 using a cutting machine 13A, and sprinkles the cut fiber tows onto the paste P. The cutting machine 13A is disposed above the first sheet S1 transported by the conveyor 23 and has a guide roller 25, a pinch roller 26, and a cutter roller 27.

The guide roller 25 guides the fiber tow CF supplied from the fiber tow supply portion 10 downward while rotating. The pinch roller 26 sandwiches the fiber tow CF with the guide roller 25 and rotates in the opposite direction to the guide roller 25, thereby drawing the separated fiber tow CF in cooperation with the guide roller 25. The cutter roller 27 cuts the fiber tow CF to a predetermined length while rotating. The cut fiber tows CF fall from between the guide roller 25 and the cutter roller 27 and are sprinkled onto the first sheet S1 onto which the paste P is applied.

As such, the cutting portion 13 executes the cutting step and the sprinkling step.

The first transportation portion 20 transports the first sheet S1 on which the cut fiber tows CF are sprinkled to the impregnation portion 16.

The second sheet supply portion 14 supplies a continuous second sheet S2 unwound from a second original roll R2 toward the second application portion 15. The SMC manufacturing device 1 includes a second transportation portion 28 configured to transport the second sheet S2 toward the impregnation portion 16.

The second transportation portion 28 is disposed above the first sheet S1 transported by the conveyor 23 and has a plurality of guide rollers 29. The second transportation portion 28 transports the second sheet S2 supplied from the second sheet supply portion 14 in an X-axis negative direction (the left side in the horizontal direction) in FIG. 1 and then changes a direction in which the second sheet S2 is transported to a Z-axis negative direction (the down side in the vertical direction) in FIG. 1 and, furthermore, the X-axis positive direction by the plurality of rotating guide rollers 29.

The second application portion 15 has a coater 30 that is disposed above the second sheet S2 transported in the X-axis negative direction and supplies the paste P. In the second application portion 15, the second sheet S2 passes through the coater 30, whereby the paste P is applied onto a surface of the second sheet S2 in a predetermined thickness.

The second transportation portion 28 transports the second sheet S2 to which the paste P is applied by the second application portion 15 to the impregnation portion 16.

The impregnation portion 16 is disposed downstream of the cutting portion 13 in the transportation direction and has a lamination mechanism 31 and a pressurization mechanism 32. The lamination mechanism 31 is disposed above the downstream-side pulley 21*b* in the conveyor 23 and has a plurality of lamination rollers 33.

The lamination rollers 33 are each arranged in a state of being in contact with a rear surface (paste P-free surface) of the second sheet S2 to which the paste P is applied. In addition, the lamination rollers 33 are each arranged such that the second sheet S2 gradually comes closer to the first sheet S1.

Therefore, the second sheet S2 is overlaid on the first sheet S1. The first sheet S1 and the second sheet S2 are transported to the pressurization mechanism 32 in a state of being laminated to each other while sandwiching the fiber tow CF and the paste P therebetween. Hereinafter, the first sheet S1 and the second sheet S2 laminated to each other will be collectively referred to as a laminated sheet S3.

The pressurization mechanism 32 is provided on the downstream side of the first transportation portion 20 (conveyor 23). The pressurization portion 32 has a lower conveyor 36A having an endless belt 35*a* looped between a pair of pulleys 34*a* and 34*b* and an upper conveyor 36B having an endless belt 35*b* looped between a pair of pulleys 34*c* and 34*d*.

The lower conveyor 36A and the upper conveyor 36B are arranged to face each other in a state in which the endless belts 35*a* and 35*b* are looped. The pressurization mechanism 32 rotates the pair of pulleys 34*a* and 34*b* of the lower conveyor 36A in the same direction to orbit the endless belt 35*a*. As a result, the pair of pulleys 34*c* and 34*d* of the upper conveyor 36B rotate in the same direction and in a direction opposite to the pair of pulleys 34*a* and 34*b*, and the endless belt 35*b* is reversely orbited at the same speed as the endless belt 35*a*. Therefore, the laminated sheet S3 sandwiched between the endless belts 35*a* and 35*b* is transported in the X-axis positive direction in FIG. 1.

The pressurization mechanism 32 has a plurality of lower rollers 37*a* and a plurality of upper rollers 37*b*. The respective lower rollers 37*a* are disposed in a state of being in contact with a rear surface of an overlapping part of the endless belt 35*a* (a region in which the endless belt sandwiches the laminated sheet S3 with the endless belt 35*b*). Similarly, the plurality of upper rollers 37*b* is arranged in a state of being in contact with a rear surface of an overlapping part of the endless belt 35*b* (a region in which the endless belt sandwiches the laminated sheet S3 with the endless belt 35*a*). The plurality of lower rollers 37*a* and the plurality of upper rollers 37*b* are arranged so as to alternate with each other in the transportation direction of the laminated sheet S3.

The pressurization mechanism 32 pressurizes the paste P and the fiber tows CF sandwiched between the first sheet S1 and the second sheet S2 using the plurality of lower rollers 37*a* and the plurality of upper rollers 37*b* while the laminated sheet S3 passes through between the endless belts 35*a* and 35*b*. At this time, the paste P penetrates between the filaments of the fiber tow CF from both sides across the fiber tow CF. Thereby, an original SMC R in which the thermosetting resin has penetrated between the filaments of the fiber tow CF is obtained.

(Method for manufacturing SMC)

Hereinafter, as an example of the method for manufacturing a fiber-reinforced resin molding material according to the embodiment, a manufacturing procedure of SMC using the above-described SMC manufacturing device 1 will be described.

At the time of manufacturing SMC using the SMC manufacturing device 1, in the application step, the long first sheet S1 is unwound from the first original roll R1 and transported by the first transportation portion 20, and the paste P comprising a desired resin is applied onto the first sheet S1 using the first application portion 12 in a predetermined thickness.

Next, in the spreading step, the fiber tow CF of a desired material is passed through between the plurality of spreading bars 17, thereby broadening the fiber tow CF in the width direction.

Next, in the separation step, the plurality of rotary blades 18 is disposed at a predetermined interval in the width direction of the fiber tow CF, positions of the cutting teeth 18a are shifted in the circumferential direction among the rotary blades, and the fiber tow CF is intermittently pierced with the plurality of cutting teeth 18a while the rotary blades 18 are rotated. Thereby, a plurality of separation-processed lines for intermittently separating the fiber tow CF in the longitudinal direction are formed. In each of the separation-processed lines, parts not pierced by the cutting teeth 18a remain unseparated.

In the separation step, the temperature of the fiber tow CF while being separated is preferably set to 60° C. or lower and more preferably set to 5° C. or higher and 50° C. or lower in order to prevent adhesion between the separated fiber tows CF.

Here, separation positions of the separated fiber tow CF will be described with reference to FIG. 3. In FIG. 3, a tow t being a spread fiber tow CF is indicated by a thin line, a separation-processed line d of the spread fiber tow CF is indicated by a thick line, and a cutting line along which the spread fiber tow CF is cut using the cutting machine 13A is indicated by a broken line.

In the separated fiber tow CF, as shown in FIG. 3, separated parts a divided by the cutting teeth 18a and unseparated parts b not divided by the cutting teeth 18a are alternately arranged in the transportation direction, and thereby the separation-processed line d of perforation shape is formed.

In this case, even when a skewing, meander or confounding of a filament has occurred in the fiber tow CF, a plurality of fiber tows CF generated by separation is partially connected to each other, and thus it is possible to transport stably to the cutting machine 13A the plurality of fiber tows CF generated by separation in a state of being spread in the width direction. In addition, even when a skewing, meander, or the like of a filament has occurred in the fiber tow CF, the fiber tow CF is not damaged. Therefore, preferably prevented is a situation in which the separated fiber tow CF is partially broken and the broken fiber tow twines around a roller or the like in the cutting portion 1.

As described above, in the method for manufacturing SMC according to the embodiment, the fiber tow is partially left unseparated in each space between parts where the fiber tow being separated into a plurality of fiber tows, whereby it is possible to stably supply the separated fiber tow CF up to the cutting machine 13A of the cutting portion 13 while avoiding the influence of the meandering of the fiber tow CF or a skewing, meandering, confounding, or the like of a filament having occurred in the fiber tow CF and to facilitate the dispersion of the fiber tows CF after cutting.

In addition, it is easy to use a relatively inexpensive large tow as the fiber tow CF, and it is possible to reduce the manufacturing cost of SMC.

In the cutting step, the fiber tow CF separated in the separation portion 13 is cut by the cutting machine 13A, and, in the sprinkling step, the cut fiber tows CF are sprinkled on the paste P applied on the first sheet S1.

The separation step and the cutting step are carried out such that the above mentioned expressions (1) to (3) are satisfied. Thereby, the reinforcing fiber of the fiber tow CF is uniformly dispersed, and the impregnatability with the resin improves, whereby it becomes possible to manufacture a high-quality SMC.

In the impregnation step, the long second sheet S2 is unwound from the second original roll R2 with the second sheet supply portion 14, and the paste P is applied onto the second sheet S2 in a predetermined thickness by the second application portion 15. Next, in the impregnation portion 16, the second sheet S2 is overlaid on the first sheet S1 by the lamination mechanism 31. Next, the paste P and the fiber tow sandwiched by the first sheet S1 and the second sheet S2 are pressurized with the pressurization mechanism 32, and thereby the thermosetting resin penetrates between the filaments of the fiber tows. Thereby obtained is an original SMC R in which the thermosetting resin has suitably penetrated between the filaments of the fiber tows CF.

The original SMC R is wound in a roll shape and then sent to the next step. The original SMC R is cut to a predetermined length, thereby finally being shipped as a sheet-like SMC (fiber-reinforced resin molding material). The first sheet S1 and the second sheet S2 are peeled off before a molding process is carried out on SMC.

The manufacturing device of the embodiment is not limited to the above-described content of the SMC manufacturing device 1, and a variety of modifications can be added thereto within the scope of the gist thereof.

Figure 4A:
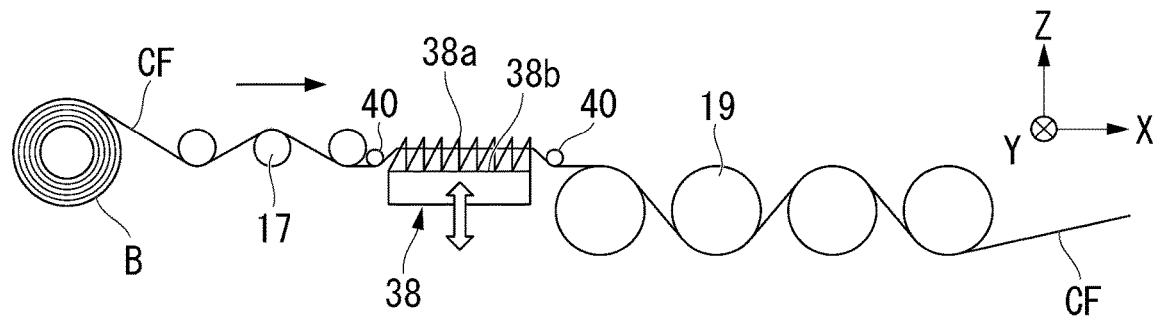
FIG. 4A is a side view showing another configurational example of the fiber tow supply portion which may be provided in the SMC manufacturing device 1.
Figure 4B:
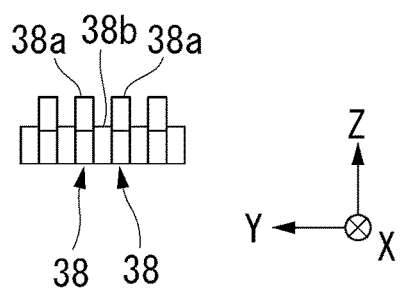
FIG. 4B is another configurational example of the fiber tow supply portion which may be provided in the SMC manufacturing device 1 and a front view of the separation portion viewed from the transportation direction.
Figure 5A:
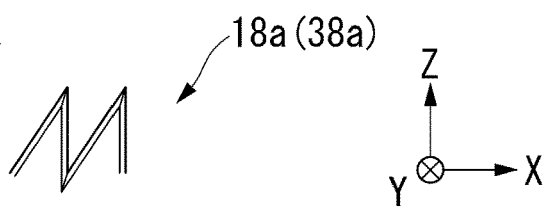
FIG. 5A is a side view exemplifying a shape of a cutting tooth.
Figure 5B:
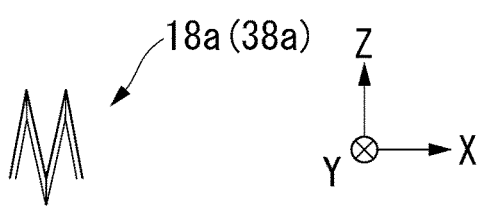
FIG. 5B is a side view exemplifying a shape of a cutting tooth.
Figure 5C:
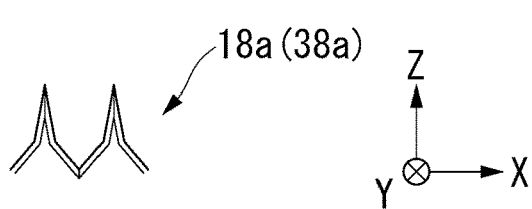
FIG. 5C is a side view exemplifying a shape of a cutting tooth.
Figure 5D:
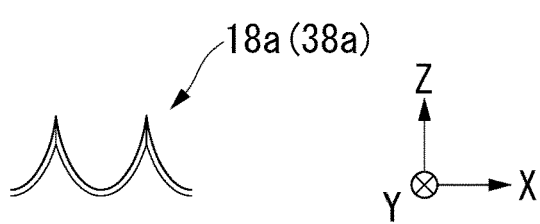
FIG. 5D is a side view exemplifying a shape of a cutting tooth.
Figure 5E:
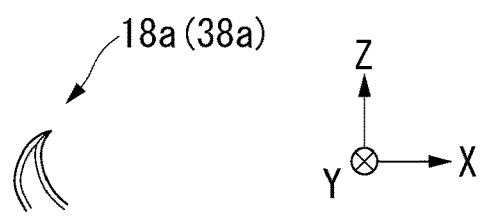
FIG. 5E is a side view exemplifying a shape of a cutting tooth.

For example, in the separation portion of the fiber tow supply portion 10, instead of the plurality of rotary blades 18, a plurality of saw blades 38 as shown in FIG. 4A and FIG. 4B may be used. FIG. 4A is a side view showing another configurational example of the fiber tow supply portion which may be provided in the SMC manufacturing device 1, and FIG. 4B is a front view of the separation portion viewed from the transportation direction.

The plurality of saw blades 38 is disposed side by side at a predetermined interval in the width direction of the spread fiber tow CF (Y-axis direction). In each of the saw blades 38, a plurality of cutting teeth 38a is serially arranged in the same direction as the transportation direction of the fiber tow CF. Furthermore, among the saw blades 38, positions of the plurality of cutting teeth 38a are preferably shifted in the longitudinal direction of the fiber tow CF. In such a case, it is possible to facilitate the dispersion of the fiber tows CF after cutting.

Between the every saw blade 38, a spacer member 38b is arranged. The upper surface of the spacer member 38b is positioned slightly above the boundary between the cutting teeth 38a (a base of a cutting tooth).

On both sides of the plurality of saw blades 38 in the transportation direction, a pair of guide members 40 is disposed. The plurality of saw blades 38 is arranged so as to be capable of reciprocally moving (shaking) vertically between a position at which the plurality of cutting teeth 38a pierce the fiber tow CF transported between the pair of guide members 40 from a side opposite to the side on which the pair of guide members 40 is arranged and a position at which the plurality of cutting teeth 38a is away from the fiber tow CF transported between the pair of guide members 40.

That is, in the separation step using the saw blades 38, the spread fiber tow CF is intermittently pierced with the plurality of cutting teeth 38a while the saw blades 38 are reciprocally moved in the vertical direction (Z-axis direction), and thereby the fiber tow CF is separated in the width direction. At this time, the plurality of cutting teeth 38a is pierced up to a position at which the spacer members 38b come into contact with the continuous fiber tow CF, whereby the fiber tow CF is prevented from being continuously separated with the cutting teeth 38a. Thereby, similar to the case of using the rotary blades 18, it is possible to leave the fiber tow CF unseparated in each space between parts where the fiber tow is separated into a plurality of fiber tows.

Therefore, it is possible to stably supply the separated fiber tow CF up to the cutting machine 13A while avoiding the influence of the meandering of the fiber tow CF or a skewing, meandering, confounding, or the like of a filament occurring in the fiber tow CF. In addition, it is possible to reduce the manufacturing cost of SMC using a relatively inexpensive large tow as the fiber tow CF.

In the manufacturing method of the embodiment using the SMC manufacturing device 1, in the separation step using the rotary blades 18 or the saw blades 38, the continuous fiber tows CF may be overlaid with each other in the thickness direction and separated into a plurality of fiber tows CF in such a state.

The cutting teeth 18a and 38a only need to have a shape enabling intermittent piercing of the fiber tow CF continuous in the transportation direction, and, for example, shapes of the cutting teeth 18a and 38a as shown in FIG. 5A to FIG. 5E may also be employed. Furthermore, the cutting teeth 18a and 38a may be a single-edged blade or a double-edged blade.

In addition, between the plurality of rotary blades 18 or saw blades 38 adjacent to each other in the width direction (Y-axis direction), the timings at which the cutting teeth 18a and 38a intermittently pierce the fiber tow CF may be matched or shifted.

In a case where the piercing timings are matched to each other, the plurality of rotary blades or the like is staggeredly arranged in the width direction of the fiber tow CF or, between the rotary blades or the like adjacent to each other, the shapes or arrangement of the cutting teeth are differentiated, whereby it is possible to satisfy the (2).

In addition, the separation portion may be configured by combining the rotary blade 18 and the saw blade 38.

Figure 6A:
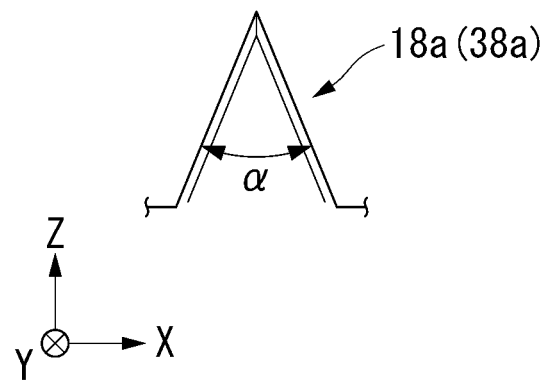
FIG. 6A is a schematic view for explaining a tip angle of a cutting tooth.
Figure 6B:
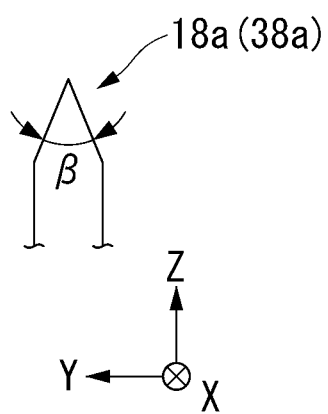
FIG. 6B is a schematic view for explaining a cutting edge angle of the cutting tooth.

In the cutting teeth 18a and 38a, a tip angle $\alpha$ shown in FIG. 6A and a cutting edge angle $\beta$ shown in FIG. 6B are preferably set to satisfy any one or both of $30° \leq \alpha \leq 90°$ and $10° \leq \beta \leq 45°$ (more preferably $20° \leq \beta \leq 30°$). In addition, the thicknesses of the cutting teeth 18a and 38a are preferably set to 0.3 to 2 mm.

The device for manufacturing a fiber-reinforced resin molding material of the present invention may not include the spreading portion. That is, a configuration in which spreading is carried out in a different device and the spread fiber tow is provided to the manufacturing device may be employed.

EXAMPLES

Hereinafter, the manufacturing method and the manufacturing device of the present invention will be more specifically described using examples. The present invention is not limited to the contents of the following examples and can be appropriately modified and carried out within the scope of the gist of the present invention.

Example 1

SMC was manufactured using the above-described SMC manufacturing device 1.

The separation portion provided with four rotary blades 18 was used. Each of the rotary blades 18 was provided with six cutting teeth 18a continuously arranged in the circumferential direction. Each of the cutting teeth 18a was of a substantially triangular shape in which the maximum thickness of a part that came into contact with the fiber tow CF was 1 mm, the maximum width of the part that came into contact with the fiber tow CF was 1 mm, the angle of a tip in the width direction (tip angle) was 64°, and the angle of an edge in the thickness direction (cutting edge angle) was 30°. The rotary blades 18 were installed to each have a position (phase) of the plurality of cutting teeth 18a in the circumferential direction shifted 30° relative to those of the rotary blade 18 adjacent thereto in the width direction of the fiber tow CF. The spacer member 18b was arranged between each space between the rotary blades 18, and the width of the spacer member 18b was 2.2 mm.

As the fiber tow CF, a carbon fiber tow (manufactured by Mitsubishi Chemical Corporation, product name: TR50S15L, the number of fibers: 15,000 fibers) was used. As the resin used in the paste P, a vinyl ester resin was used.

With the spreading bars 17, the fiber tow CF was broadened to a width of 15 mm. The transportation rate of the fiber tow CF during the separation was set to 40 m/min. By the separation using the four rotary blades 18, in the spread fiber tow CF, four separation-processed lines were formed at an interval of 3 mm in the width direction of the fiber tow CF, such that 56.6 mm-long separated parts a and 0.5 mm-long unseparated parts b are alternately and continuously arranged in the longitudinal direction of the fiber tow CF and the distance c is 28.1 mm between two ends of separated parts selected respectively from two of the separation-processed lines being adjacent with each other in the width direction of the fiber tow CF to include no unseparated part therebetween. Cutting using the cutting machine 13A was carried out at an interval (L) of 25.4 mm in the longitudinal direction of the separated fiber tow CF. The cut fiber tows CF were sprinkled on the paste P applied onto the first sheet S1. The carbon fiber content of the manufactured fiber-reinforced resin molding material was 58%.

In Example 1, c/L was 1.11, c<a, b/L was 0.02, a/(a+b) was 0.99, and all of the above-described conditions of expressions (1) to (4) were satisfied.

Example 2

As the SMC manufacturing device 1, the fiber tow CF, and the paste P, the same device, fiber tow, and paste as in Example 1 were used.

The length of a separated part a was set to 113.2 mm, which was twice the length in Example 1, and the length of an unseparated part b was set to 0.8 mm. In addition, the distance c between two ends of the separated parts selected respectively from two of the separation-processed lines being adjacent with each other in the width direction of the fiber tow CF to include no unseparated part therebetween was set to 56.2 mm, which was twice the distance in Example 1. SMC was manufactured in the same order as in Example 1 except for the above-described points.

In Example 2, c/L was 2.21, c<a, b/L was 0.03, a/(a+b) was 0.99, and all of the above-described conditions of expressions (1) to (4) were satisfied.

Example 3

As the SMC manufacturing device 1, the fiber tow CF, and the paste P, the same device, fiber tow, and paste as in Example 1 were used.

The length of a separated part a was set to 259.0 mm, and the length of an unseparated part b was set to 1.0 mm. The distance c between two ends of the separated parts selected respectively from two of the separation-processed lines being adjacent with each other in the width direction of the fiber tow CF to include no unseparated part therebetween was set to 129.0 mm. SMC was manufactured in the same order as in Example 1 except for the above-described points.

In Example 3, c/L was 5.08, c<a, b/L was 0.04, a/(a+b) was 0.99, and all of the above-described conditions of expressions (1) to (4) were satisfied.

Example 4

As the SMC manufacturing device 1, the fiber tow CF, and the paste P, the same device, fiber tow, and paste as in Example 1 were used.

The length of a separated part a was set to 849 mm, and the length of an unseparated part b was set to 5 mm. In addition, the distance c between two ends of the separated parts selected respectively from two of the separation-processed lines being adjacent with each other in the width direction of the fiber tow CF to include no unseparated part therebetween was set to 823 mm. SMC was manufactured in the same order as in Example 1 except for the above-described points.

In Example 4, c/L was 32.4, c<a, b/L was 0.20, a/(a+b) was 0.99, and all of the above-described conditions of expressions (1) to (4) were satisfied.

Comparative Example 1

The same SMC manufacturing device 1 as in Example 1 was used, but the four rotary blades 18 were installed such that the positions of the plurality of cutting teeth 18a in the circumferential direction all coincided with each other. As the fiber tow CF and the paste P, the same fiber tow and paste as in Example 1 were used.

The length of a separated part a was set to 28.3 mm, which was half the length in Example 1. The distance c between two ends of the separated parts selected respectively from two of the separation-processed lines being adjacent with each other in the width direction of the fiber tow CF to include no separated part therebetween was 28.3 mm due to the above-described change in the installation of the rotary blades 18. SMC was manufactured in the same order as in Example 1 except for the above-described points.

In Comparative Example 1, c/L was 1.11, c=a, b/L was 0.02, a/(a+b) was 0.98, and, among the above-described conditions of expressions (1) to (4), (2) was not satisfied.

Comparative Example 2

As the SMC manufacturing device 1, the fiber tow CF, and the paste P, the same device, fiber tow, and paste as in Example 1 were used.

The length of a separated part a was set to 1,584.8 mm, and the length of an unseparated part b was set to 10 mm. The distance c between two ends of the separated parts selected respectively from two of the separation-processed lines being adjacent with each other in the width direction of the fiber tow CF to include no separated part therebetween was set to 1,558.8 mm.

In Comparative Example 2, c/L was 61.3, c<a, b/L was 0.39, a/(a+b) was 0.99, and, among the above-described conditions of expressions (1) to (4), (1) was not satisfied.

The examples and comparative examples were evaluated using the following methods.

(Dividability of Cut Fiber Tow)

As an index of the dividability of the cut fiber tow, the number of tows remaining connected in one cut fiber tow CF was used.

The cut fiber tows CF were sprinkled on the first sheet S1 to which the resin was not applied and thereafter, the widths and lengths of a cut fiber tow picket out with tweezers was measured using a caliper in increments of 0.1 mm, and the weight of the cut fiber tow was measured using an electronic scale in increments of 0.1 mg. The number of samplings was set to 500. The number of filaments of a cut fiber tow was calculated using the following expression, and the ratio of a specific fiber tow to all of the fiber tows was obtained by counting a fiber tow with from 4,000 to less than 7,000 filaments as two connected tows, a fiber tow with from 7,000 to less than 10,000 filaments as three connected tows, a fiber tow with from 10,000 to less than 13,000 filaments as four connected tows, and a fiber tow with from 13,000 to 15,000 filaments as five connected tows.

The number of filaments of a cut fiber tow=[(the weight of the cut fiber tow)×(the number of filaments of the continuous carbon fiber used)]/[(the length of the cut fiber tow)×(the weight per length of the continuous carbon fiber used)]

(Mechanical Characteristic of Molded Article Using SMC)

As a mechanical characteristic of a molded article using SMC, a tensile strength was evaluated.

SMC of each example was disposed in a mold capable of processing flat plates and cured by being pressurized at 10 MPa and approximately 130° C. for five minutes with a pressurization-type press, thereby obtaining a 300×300 (unit: mm) flat plate. Six 250×25×2 (unit: mm) test specimens were cut from the flat plate respectively along a 0° direction (X axis of the SMC manufacturing device 1) and along a 90° direction (12 specimens in total), tensile strengths were measured according to JIS K 7073, and the variation of the tensile strengths was calculated.

The results of the examples and comparative examples are shown in Table 1.

TABLE 1

|  |  | Example 1 | Example 2 | Example 3 | Example 4 | Comparative Example 1 | Comparative Example 2 |
|---|---|---|---|---|---|---|---|
| b/L | — | 0.02 | 0.03 | 0.04 | 0.20 | 0.02 | 0.39 |
| c/L | — | 1.11 | 2.21 | 5.08 | 32.4 | 1.11 | 61.3 |
| a/(a + b) | — | 0.99 | 0.99 | 0.99 | 0.99 | 0.98 | 0.99 |

TABLE 1-continued

|  |  | Example 1 | Example 2 | Example 3 | Example 4 | Comparative Example 1 | Comparative Example 2 |
|---|---|---|---|---|---|---|---|
| Division number in fiber tow width direction | Division number | 5 | 5 | 5 | 5 | 5 | 5 |
| Dividability of cut fiber tows | Two connected tows % | 38 | 10 | 3 | 1 | 0 | — |
|  | Three connected tows % | 0 | 0 | 0 | 0 | 0 | — |
|  | Four connected tows % | 0 | 0 | 0 | 0 | 0 | — |
|  | Five connected tows % | 0 | 0 | 0 | 0 | 14 | — |
| Tensile strength | MPa | 280 | 300 | 295 | 305 | 270 | — |
| Variation of tensile strength | % | 8 | 5 | 4 | 5 | 16 | — |
| Process trouble | — | — | — | — | — | — | Twining of fiber tow after separation |

In Example 1, the separated fiber tows CF were stably supplied to the cutting portion 13 without a part thereof twining around a roll or the like. In the cut fiber tows CF, two tows connected through the unseparated part were present as much as 38%, but three or more connected tows were not present, which did not affect the dispersibility of the fiber tows CF on the paste P. Regarding the quality, the manufactured SMC exhibited a mechanical characteristic almost the same as that of SMC which was obtained using a carbon fiber tow CF having a small number of filaments (the number of filaments: 3,000) without the separation step and comprised chopped carbon fiber tows of the same size as the carbon fiber tow. The variation of the tensile strengths was 8%, and there was no partial significant decrease in the strength.

In Example 2 as well, the separated fiber tows CF were stably supplied to the cutting portion 13. In the cut fiber tows CF, two tows connected through the unseparated parts were present as much as 10%, but three or more connected tows were not present, which did not affect the dispersibility of the fiber tows CF on the paste P. Regarding the quality, the manufactured SMC exhibited a mechanical characteristic almost the same as that of SMC which was obtained using a carbon fiber tow CF having a small number of filaments (the number of filaments: 3,000) without the separation step and comprised chopped carbon fiber tows of the same size as the carbon fiber tow. The variation of the tensile strengths was 5%, and there was no partial significant decrease in the strength.

In Example 3, there were cases where a part of the separated fiber tows CF twined around a roll or the like and the manufacturing of SMC was stopped, but the frequency was low, and the influence on the manufacturing was small.

In the cut fiber tows CF, two tows connected through the unseparated parts were present as much as 3%, but three or more connected tows were not present, which did not affect the dispersibility of the fiber tow CF on the paste P. Regarding the quality, the manufactured SMC exhibited a mechanical characteristic almost the same as that of SMC which was obtained using a carbon fiber tow CF having a small number of filaments (the number of filaments: 3,000) without the separation step and comprised chopped carbon fiber tows of the same size as the carbon fiber tow. The variation of the tensile strengths was 4%, and there was no partial significant decrease in the strength.

In Example 4, there were cases where a part of the separated fiber tows CF twined around a roll or the like and the manufacturing of SMC was stopped, but the frequency was low, and the influence on the manufacturing was small.

In the cut fiber tows CF, two tows connected through the unseparated parts were present as much as 1%, but more than three connected tows were not present, which did not affect the dispersibility of the fiber tow CF on the paste P. Regarding the quality, the manufactured SMC exhibited a mechanical characteristic almost the same as that of SMC which was obtained using a carbon fiber tow CF having a small number of filaments (the number of filaments: 3,000) without the separation step and comprised chopped carbon fiber tows of the same size as the carbon fiber tow. The variation of the tensile strengths was 5%, and there was no partial significant decrease in the strength.

In Comparative Example 1, there was no case where a part of the separated fiber tow CF twined around a roll or the like, and the separated fiber tow were stably supplied to the cutting portion 13; however, in the cut fiber tows CF, five tows connected through the unseparated parts were present as much as 14%. Regarding the quality, the manufactured SMC partially exhibited a mechanical characteristic almost the same as that of SMC which was obtained using a carbon fiber tow CF having a small number of filaments (the number of filaments: 3,000) without the separation step and comprised chopped carbon fiber tows of the same size as the carbon fiber tow, and partially exhibited a poor mechanical characteristic. The variation of the tensile strengths was as great as 16%, and it was not possible to produce an original SMC R having a uniform mechanical characteristic.

In Comparative Example 2, a part of the separated fiber tows CF twined around a roll or the like and it was not possible to manufacture SMC.

What has been described above shows that the manufacturing method and the manufacturing device of the embodiment enable the efficient manufacturing of a fiber-reinforced resin molding material having a favorable mechanical characteristic even with a step of separating a large tow.

INDUSTRIAL APPLICABILITY

According to the method and the device for manufacturing a fiber-reinforced resin molding material of the present invention, it is possible to maintain the quality of a fiber-reinforced resin molding material to be manufactured and stably supply a separated fiber tow up to a cutting machine while avoiding an influence of the meandering of the fiber tow or a skewing or meandering of a filament occurring in the fiber tow, and also the cut fiber tows are easily dispersed.

REFERENCE SIGNS LIST

1 SMC manufacturing device (manufacturing device)
10 Fiber tow supply portion
11 First sheet supply portion
12 First application portion
13 Cutting portion
13A Cutting machine
14 Second sheet supply portion
15 Second application portion
16 Impregnation portion
18 Rotary blade
18a, 38a Cutting tooth
18b, 38b Spacer member
20 First transportation portion
28 Second transportation portion
31 Lamination mechanism
32 Pressurization mechanism
38 Saw blade
40 Guide member
CF Fiber tow
P Paste
S1 First sheet
S2 Second sheet
S3 Laminated sheet
R Original SMC

The invention claimed is:

1. A method for manufacturing a fiber-reinforced resin molding material in which a cut fiber tow is impregnated with a resin, the method including:
 a separation step of intermittently separating a fiber tow along a longitudinal direction thereof and forming at least two separation-processed lines extending in the longitudinal direction and arranged side by side in a width direction of the fiber tow; and
 a cutting step of cutting the fiber tow after the separation step at an interval in the longitudinal direction,
 wherein the separation step and the cutting step are carried out so as to satisfy all of (1) to (3) below.

$$1 \leq c/L \leq 50 \quad (1)$$

$$c < a \quad (2)$$

$$b/L < 1 \quad (3)$$

(in the (1) to (3), "c" is a overlapping length of separated parts when one of the separation-processed lines is projected to another separation-processed line adjacent thereto in the width direction; "L" is the intervals in the cutting step; "a" is a length of the separated part in the separation-processed line; and "b" is a length of an unseparated part in the separation-processed line).

2. The method for manufacturing a fiber-reinforced resin molding material according to claim 1, wherein the separation step and the cutting step are carried out so as to further satisfy the following (4).

$$0.9 \leq a/(a+b) < 1 \quad (4)$$

3. The method for manufacturing a fiber-reinforced resin molding material according to claim 1, wherein the separation-processed lines are formed by intermittently piercing the fiber tow with a plurality of cutting teeth arranged at a predetermined interval in the width direction of the fiber tow.

4. The method for manufacturing a fiber-reinforced resin molding material according to claim 3, wherein the plurality of cutting teeth are provided by arranging, side by side at a predetermined interval in the width direction, a plurality of rotary blades each having the cutting teeth arranged circumferentially, and the plurality of cutting teeth pierce the fiber tow while the plurality of rotary blades are rotated.

5. The method for manufacturing a fiber-reinforced resin molding material according to claim 3, wherein the plurality of cutting teeth are provided by disposing, side by side at a predetermined interval in the width direction, a plurality of saw blades each having the cutting teeth arranged along a transportation direction of the fiber tow, and the plurality of cutting teeth pierce the fiber tow while the plurality of saw blades are reciprocally moved close to and away from the fiber tow.

6. The method for manufacturing a fiber-reinforced resin molding material according to claim 1, wherein the separation step is carried out in a state in which a plurality of the fiber tows is overlaid together.

7. The method for manufacturing a fiber-reinforced resin molding material according to claim 1, wherein the resin is a thermosetting resin.

8. The method for manufacturing a fiber-reinforced resin molding material according to claim 1, the method further including:
 a step of applying a paste comprising the resin onto a first sheet transported in a predetermined direction;
 a step of sprinkling cut fiber tows onto the first sheet with the paste applied thereon; and
 a step of overlaying a second sheet with the paste applied thereon on the first sheet with the fiber tows sprinkled thereon and then pressurizing the paste and the fiber tows sandwiched between the first sheet and the second sheet, thereby making the resin penetrate between filaments of the fiber tows.

9. The method for manufacturing a fiber-reinforced resin molding material according to claim 1, the method further including:
 a spreading step that is carried out before the separation step and for spreading the fiber tow in the width direction.

10. The method for manufacturing a fiber-reinforced resin molding material according to claim 1, wherein the fiber tow is a carbon fiber tow.

11. A method for manufacturing a fiber-reinforced resin molding material in which a cut fiber tow is impregnated with a resin, the method including:
 preparing a continuous fiber tow having at least two separation-processed lines extending in a longitudinal direction and arranged side by side in a width direction of the continuous fiber tow; and
 cutting the continuous fiber tow at an interval in the longitudinal direction,
 wherein all of (1) to (3) below are satisfied.

$$1 \leq c/L \leq 50 \quad (1)$$

$$c < a \quad (2)$$

$$b/L < 1 \quad (3)$$

(in the (1) to (3), "c" is an overlapping length of separated parts when one of the separation-processed lines is projected to another separation-processed line adjacent thereto in the width direction; "L" is the interval in the cutting; "a" is a length of the separated part in the separation-processed line; and "b" is a length of an unseparated part in the separation-processed line).

12. The method according to claim 11, wherein the separation-processed lines satisfy the following (4).

$$0.9 \leq a/(a+b) < 1 \qquad (4)$$

13. The method according to claim 11, wherein the continuous fiber tow is a carbon fiber tow.

14. The method according to claim 11, further including:
applying a paste comprising the resin onto a first sheet transported in a predetermined direction;
sprinkling cut fiber tows onto the first sheet with the paste applied thereon; and
overlaying a second sheet with a paste comprising the resin applied thereon on the first sheet with the fiber tows sprinkled thereon and then pressurizing the paste and the fiber tows sandwiched between the first sheet and the second sheet, thereby making the resin penetrate between filaments of the fiber tows.

15. The method according to claim 11, wherein the resin is a thermosetting resin.

16. A continuous fiber tow having at least two separation-processed lines extending in a longitudinal direction and arranged side by side in a width direction of the continuous fiber tow, wherein all of (1) to (3) below are satisfied.

$$1 \leq c/L \leq 50 \qquad (1)$$

$$c < a \qquad (2)$$

$$b/L < 1 \qquad (3)$$

(in the (1) to (3), "c" is an overlapping length of separated parts when one of the separation-processed lines is projected to another separation-processed line adjacent thereto in the width direction; "L" is 25.4 (mm); "a" is a length of the separated part in the separation-processed line; and "b" is a length of an unseparated part in the separation-processed line).

17. The continuous fiber tow according to claim 16, wherein the separation-processed lines satisfy the following (4).

$$0.9 \leq a/(a+b) < 1 \qquad (4)$$

18. The continuous fiber tow according to claim 16, wherein the continuous fiber tow is a carbon fiber tow.

* * * * *